United States Patent
He et al.

(10) Patent No.: US 12,368,547 B2
(45) Date of Patent: Jul. 22, 2025

(54) UPLINK TRANSMISSION ENHANCEMENTS FOR MULTI-TRP OPERATION

(71) Applicant: Apple Inc., Cupertino, CA (US)

(72) Inventors: Hong He, San Jose, CA (US);
Chunxuan Ye, San Diego, CA (US);
Dawei Zhang, Saratoga, CA (US);
Haitong Sun, Cupertino, CA (US); Jie Cui, San Jose, CA (US); Oghenekome Oteri, San Diego, CA (US); Wei Zeng, Saratoga, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 17/593,424

(22) PCT Filed: Oct. 15, 2020

(86) PCT No.: PCT/CN2020/121209
§ 371 (c)(1),
(2) Date: Sep. 17, 2021

(87) PCT Pub. No.: WO2022/077355
PCT Pub. Date: Apr. 21, 2022

(65) Prior Publication Data
US 2022/0303079 A1   Sep. 22, 2022

(51) Int. Cl.
*H04B 7/06* (2006.01)
*H04B 7/08* (2006.01)
(Continued)

(52) U.S. Cl.
CPC .......... *H04L 5/0035* (2013.01); *H04L 5/0048* (2013.01); *H04L 5/0053* (2013.01);
(Continued)

(58) Field of Classification Search
CPC .... H04W 16/28; H04W 72/20; H04W 72/044
See application file for complete search history.

(56) References Cited

U.S. PATENT DOCUMENTS 11,159,347 B2 * 10/2021 Ahn ................ H04L 25/0224
11,382,076 B2 *  7/2022 Cheng ................ H04W 72/23
(Continued)

FOREIGN PATENT DOCUMENTS

CN        110313199        10/2019
CN        110475360        11/2019
(Continued)

OTHER PUBLICATIONS

Vivo, "Discussion on MTRP multi-beam enhancement", 3GPP TSG RAN WG1 #102-e, R1-2005366; Aug. 28, 2020; 5 sheets.
(Continued)

*Primary Examiner* — Yemane Mesfin
*Assistant Examiner* — Jia Hao Deng
(74) *Attorney, Agent, or Firm* — Fay Kaplun & Marcin, LLP (57) ABSTRACT

A base station and a user equipment (UE) communicate the configure uplink communications in a multi-transmission and reception point (multi-TRP) configured network. The UE receives an indication of multiple sounding reference signal (SRS) resources that are to be used for uplink beam tracking, wherein each SRS resource is associated with different spatial relation information, transmits SRS using the associated spatial relation information, receives an indication that a user equipment (UE) is configured with one or more beam pairs, the one or more beam pairs configured by the network based on the SRS and transmits an uplink channel based on the indicated one or more beam pairs.

20 Claims, 10 Drawing Sheets

(51) Int. Cl.
*H04L 5/00* (2006.01)
*H04W 16/28* (2009.01)
*H04W 72/044* (2023.01)
*H04W 72/20* (2023.01)

(52) U.S. Cl.
CPC .......... *H04W 16/28* (2013.01); *H04W 72/20* (2023.01); *H04W 72/044* (2013.01)

(56) References Cited

U.S. PATENT DOCUMENTS

| | | | | |
|---|---|---|---|---|
| 2018/0206132 | A1* | 7/2018 | Guo | H04W 72/0473 |
| 2020/0162289 | A1 | 5/2020 | Ahn et al. | |
| 2020/0314664 | A1 | 10/2020 | Zhou et al. | |
| 2021/0392673 | A1* | 12/2021 | Miao | H04W 72/1268 |
| 2022/0263621 | A1* | 8/2022 | Cha | G01S 1/0428 |
| 2022/0416957 | A1* | 12/2022 | Shao | H04L 1/1896 |

FOREIGN PATENT DOCUMENTS

| | | |
|---|---|---|
| CN | 110637495 | 12/2019 |
| CN | 111656842 | 9/2020 |
| WO | WO-2018171768 A1 * | 9/2018 |
| WO | 2019/195528 | 10/2019 |
| WO | 2020/076841 | 4/2020 |
| WO | 2020/092260 | 5/2020 |

OTHER PUBLICATIONS

Vivo, "Further discussion on Multi-Beam Operation", 3GPP TSG RAN WG1 #98, R1-1908167, Aug. 17, 2019, 12 sheets.

MediaTek Inc., "Enhancements on Multi-TRP for PDCCH, PUSCH and PUCCH", 3GPP TSG RAN WG1 #102-e, R1-2005621, Aug. 8, 2020, 5 sheets.

Samsung, "Discussions on NR UL multi-TRP and multi-panel support", 3GPP TSG RAN WG1 Meeting #89, R1-1707949, May 4, 2017, 3 sheets.

Spreadtrum Communications, Discussion on enhancements on Multi-TRP for PDCCH, PUCCH and PUSCH, 3GPP TSG RAN WGI#102-e, R1-2006258, Aug. 8, 2020, 5 sheets.

Lenovo et al., "Discussion on UL multi-panel transmission", 3GPP TSG RAN WG1 Meeting #97, R1-1906276, May 13, 2019, 8 sheets.

* cited by examiner

|   |   |   |   |   |   |   |   |   |
|---|---|---|---|---|---|---|---|---|
|   | R | R | Serving cell ID | | | | BWP-ID | Oct.1 |
|   |   |   | PUCCH Resource Pair | | | | | oct.2 |
|   | BP7 | BP6 | BP5 | BP4 | BP3 | BP2 | BP1 | BP0 | oct.3 |

Option.1

|   |   |   |   |   |
|---|---|---|---|---|
| R | R | R | BP Index | oct.3 |

Option.2

Fig. 5a

| Pair Index | PUCCH Resource pair | |
|---|---|---|
| | PUCCH resource | |
| 0 | The 1st PUCCH resource | The 2nd PUCCH resource |
| 1 | The 1st PUCCH resource | The 2nd PUCCH resource |
| 2 | The 1st PUCCH resource | The 2nd PUCCH resource |
| ... | ... | ... |

| TDRA value in scheduling DCI | Time domain resource allocation | |
|---|---|---|
| 0 | TDRA config-1 by RRC | TDRA config-2 by RRC |
| 1 | TDRA config-1 by RRC | TDRA config-2 by RRC |
| 2 | TDRA config-1 by RRC | TDRA config-2 by RRC |
| 3 | TDRA config-1 by RRC | TDRA config-2 by RRC |
| ... | | |
| | Spatial Relation # 1 | Spatial Relation # 2 |

Fig. 8

| Pair Index | PUCCH Resource pair | | Comments |
|---|---|---|---|
| 0 | \<PUCCH format 0, 2\> | \<PUCCH format 0, 2\> | Middle of two TRPs, similar pathloss |
| 1 | \<PUCCH format 0, 1\> | \<PUCCH format 1, 2\> | Close to TRP #1. TRP#2 is fallback purpose only |
| 2 | \<PUCCH format 3, 4\> | \<PUCCH format 3, 1\> | Close to TRP #2. TRP#1 is fallback for robustness purpose |
| ... | ... | ... | |

905 repetition numbers configured by RRC signaling on a per PRP basis

UPLINK TRANSMISSION ENHANCEMENTS FOR MULTI-TRP OPERATION

BACKGROUND

A network may deploy a cell that is configured with multiple transmission reception points (TRPs). A multi-TRP deployment scenario may support downlink and uplink communications with a user equipment (UE). For multi-TRP operation, UE uplink transmission repetition has been identified as a mechanism that may be enhanced to provide performance and coverage benefits for both the UE and the network.

SUMMARY

Some exemplary embodiments are related to a processor configured to perform operations. The operations include receiving an indication of multiple sounding reference signal (SRS) resources that are to be used for uplink beam tracking, wherein each SRS resource is associated with different spatial relation information, transmitting SRS using the associated spatial relation information, receiving an indication that a user equipment (UE) is configured with one or more beam pairs, the one or more beam pairs configured by the network based on the SRS and transmitting an uplink channel based on the indicated one or more beam pairs.

Other exemplary embodiments are related to a user equipment (UE) including a transceiver configured to communicate with multiple networks and a processor communicatively coupled to the transceiver and configured to perform operations. The operations include receiving an indication of multiple sounding reference signal (SRS) resources that are to be used for uplink beam tracking, wherein each SRS resource is associated with different spatial relation information, transmitting SRS using the associated spatial relation information, receiving an indication that the UE is configured with one or more beam pairs, the one or more beam pairs configured by the network based on the SRS and transmitting an uplink channel based on the indicated one or more beam pairs.

Still further exemplary embodiments are related to a base station including a transceiver configured to communicate with a user equipment (UE) and a processor communicatively coupled to the transceiver and configured to perform operations. The operations include transmitting, to the UE, an indication of multiple sounding reference signal (SRS) resources that are to be used for uplink beam tracking, wherein each SRS resource is associated with different spatial relation information, measuring the SRS transmitted by the UE using the associated spatial relation information, transmitting, to the UE, an indication that the UE is configured with one or more beam pairs, the one or more beam pairs configured by the base station based on the SRS and receiving, from the UE, an uplink channel based on the indicated one or more beam pairs.

DETAILED DESCRIPTION

The exemplary embodiments may be further understood with reference to the following description and the related appended drawings, wherein like elements are provided with the same reference numerals. The exemplary embodiments relate to user equipment (UE) uplink transmissions for a multi-transmission reception point (TRP) deployment scenario.

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a 5G new radio (NR) network. However, reference to a 5G NR network is merely provided for illustrative purposes. The exemplary embodiments may be utilized with any network that is configured with multi-TRP capability. Therefore, the 5G NR network as described herein may represent any type of network that is configured with multi-TRP capability.

The 5G NR network may deploy a next generation node B (gNB) that is configured with multiple TRPs. Throughout this description, a TRP generally refers to a set of components configured to transmit and/or receive signals. In some embodiments, multiple TRPs may be deployed locally at the gNB. For example, the gNB may include multiple antenna arrays/panels that are each configured to generate a different beam. In other embodiments, multiple TRPs may be deployed at various different locations and connected to the gNB via a backhaul connection. For example, multiple small cells may be deployed at different locations and connected to the gNB. However, these examples are merely provided for illustrative purposes. Those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes. The TRPs described herein may represent any type of network component configured to transmit and/or receive a signal.

In some of the examples provided below, the signaling between the UE 110 and one or more of the TRPs may be achieved via beamforming. A person of ordinary skill in the art would understand that beamforming is an antenna technique that is utilized to transmit or receive a directional signal. From the perspective of a transmitting device, beamforming may refer to propagating a directional signal. Throughout this description, a beamformed signal may be referred to as a "beam" or a "transmitter beam." The transmitter beam may be generated by having a plurality of antenna elements radiate the same signal. Increasing the number of antenna elements radiating the signal decreases the width of the radiation pattern and increases the gain. Thus, a transmitter beam may vary in width and be propagated in any of a plurality of different directions.

From the perspective of a receiving device, beamforming may refer to tuning a receiver to listen to a direction of interest. Throughout this description, the spatial area encompassed by the receiver listening in the direction of interest may be referred to as a "beam" or a "receiver beam." The receiver beam may be generated by configuring the parameters of a spatial filter on a receiver antenna array to listen in a direction of interest and filter out any noise from outside the direction of interest. Like a transmitter beam, a receiver beam may also vary in width and be directed in any of a plurality of different areas of interest.

In addition, the exemplary embodiments are described with regard to the UE performing an uplink transmission. For example, the UE may communicate with the network via a physical uplink control channel (PUCCH) or a physical uplink shared channel (PDSCH). As will be described in more detail below, the exemplary embodiments include various enhancements for UE PUCCH transmissions and UE PDSCH transmissions. In one aspect, the exemplary embodiments relate to enhancing UE transmission repetition for multi-TRP operations. For example, implementing sub-slot based PUCCH repetition may reduce latency and increase the coverage for a multi-TRP deployment scenario. This exemplary enhancement and the other exemplary enhancements described herein may be used in conjunction with current UE transmission techniques for multi-TRP operation, future implementations of UE transmission techniques for multi-TRP operation or independently from other UE transmission techniques.

Figure 1:
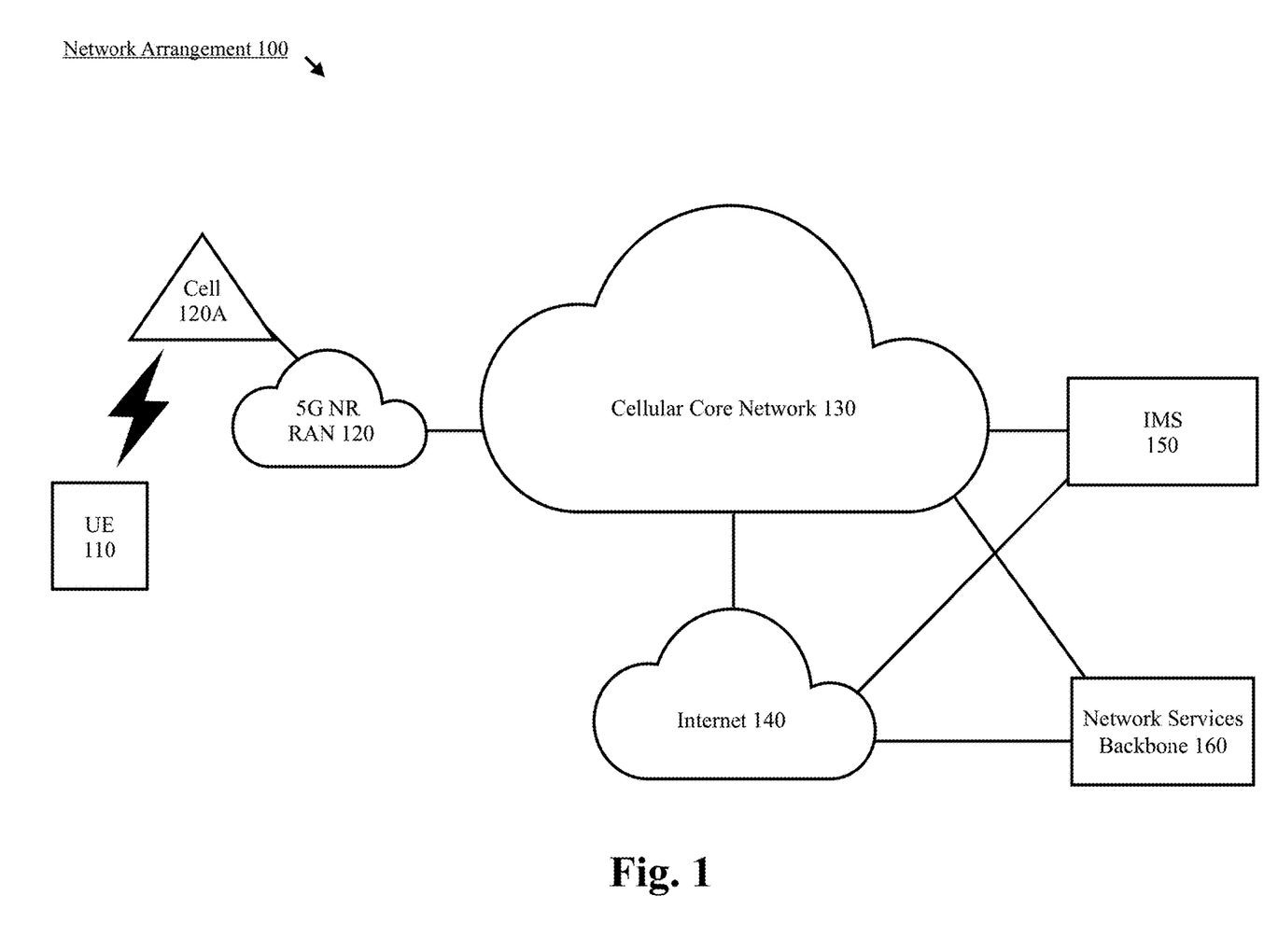
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, Sprint, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB that is configured with multiple TRPs. Each TRP may represent one or more components configured to transmit and/or receive a signal. In some embodiments, multiple TRPs may be deployed locally at the cell 120A. In other embodiments, multiple TRPs may be distributed at different locations and connected to the gNB.

Figure 2:
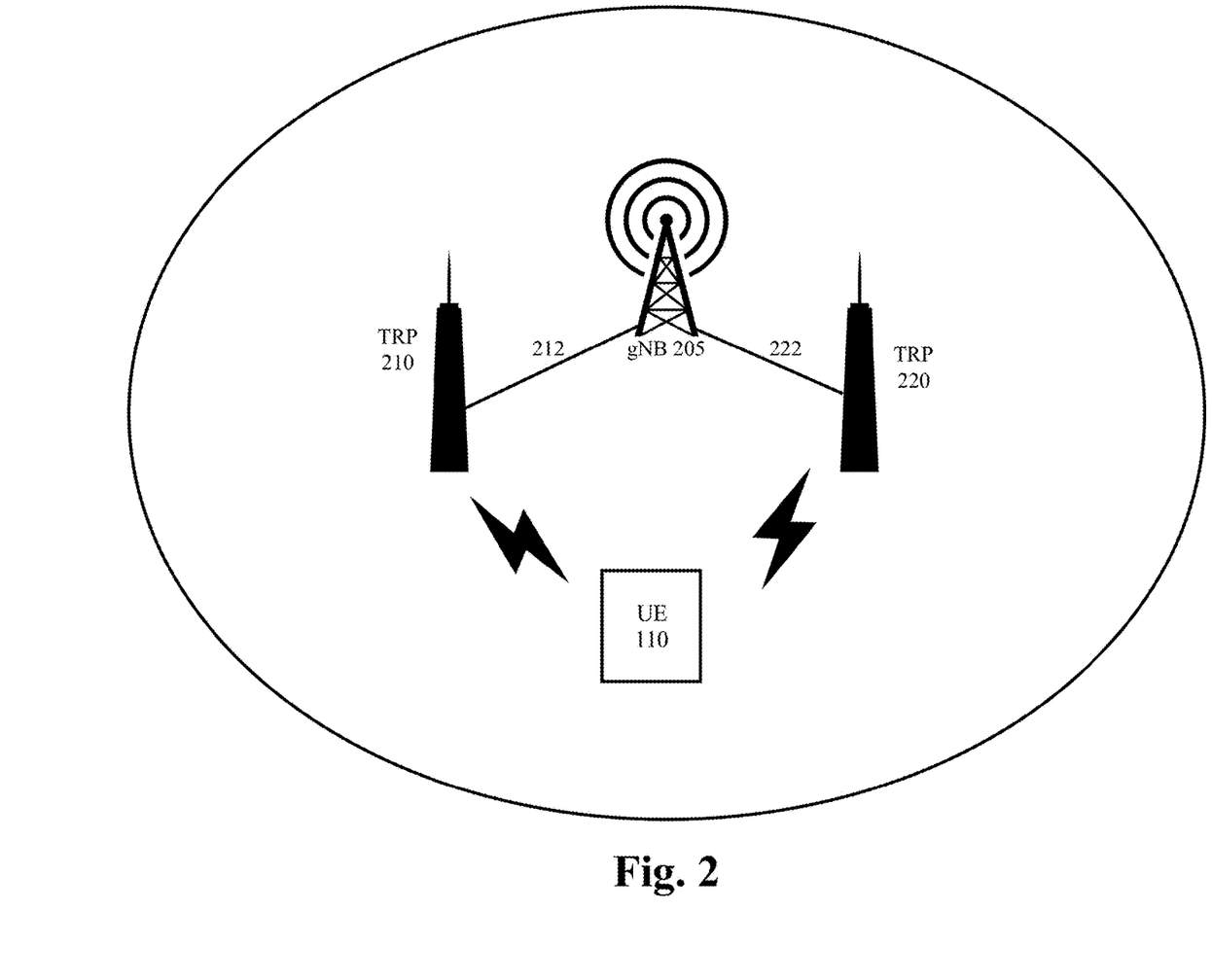
FIG. 2 shows an example of multiple transmission reception points (TRPs) deployed at different locations.

FIG. 2 shows an example of multiple TRPs deployed at different locations. In this example, the gNB 205 is configured with a first TRP 210 via a backhaul connection 212 and a second TRP 220 via backhaul connection 222. Each of the TRPs 210, 220 may transmit a signal to and/or receive a signal from the UE 110. However, the gNB 205 may be configured to control the TRPs 210, 220 and perform operations such as, but not limited to, assigning resources, triggering uplink transmissions, receiving uplink control information and/or data, etc.

The example shown in FIG. 2 is not intended to limit the exemplary embodiments in any way. Those skilled in the art will understand that 5G NR TRPs are adaptable to a wide variety of different conditions and deployment scenarios. An actual network arrangement may include any number of different types of cells and/or TRPs being deployed by any number of RANs in any appropriate arrangement. Thus, the example of a single cell 120A in FIG. 1 and a single gNB 205 with two TRPs 210, 220 in FIG. 2 is merely provided for illustrative purposes.

Returning to the network arrangement 100 of FIG. 1, the cell 120A may include one or more communication interfaces to exchange data and/or information with UEs, the corresponding RAN, the cellular core network 130, the internet 140, etc. Further, the cell 120A may include a processor configured to perform various operations. For example, the processor of the cell 120A may be configured to perform operations related to assigning uplink resources, triggering uplink transmission, receiving uplink control information, receiving uplink data, etc. However, reference to a processor is merely for illustrative purposes. The operations of the cell 120A may also be represented as a separate incorporated component of the cell 120A or may be a modular component coupled to the cell 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cell 120A) of the 5G NR RAN 120. However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
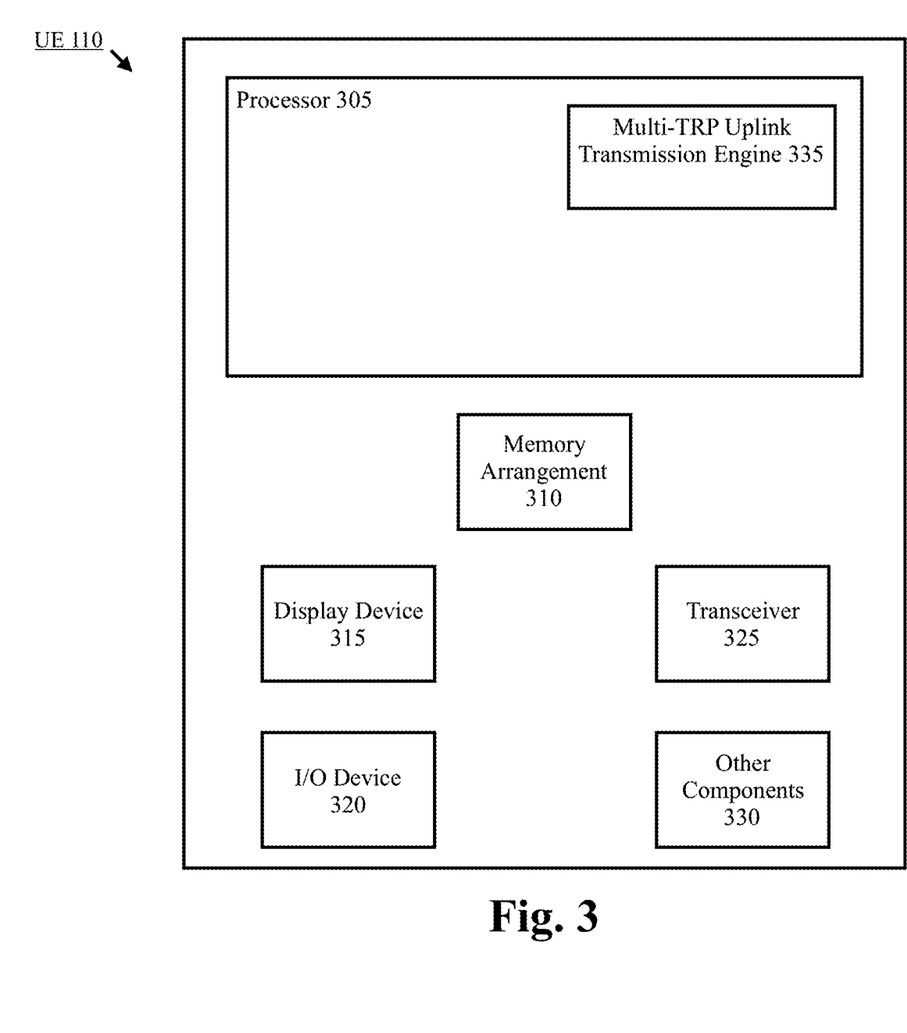
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a multi-TRP uplink transmission engine 335. The multi-TRP uplink transmission engine 335 may be configured to perform various operations related to uplink transmission in a multi-TRP deployment scenario such as implementing an exemplary uplink transmission repetition technique.

The above referenced engine being an application (e.g., a program) executed by the processor 305 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

Figure 4:
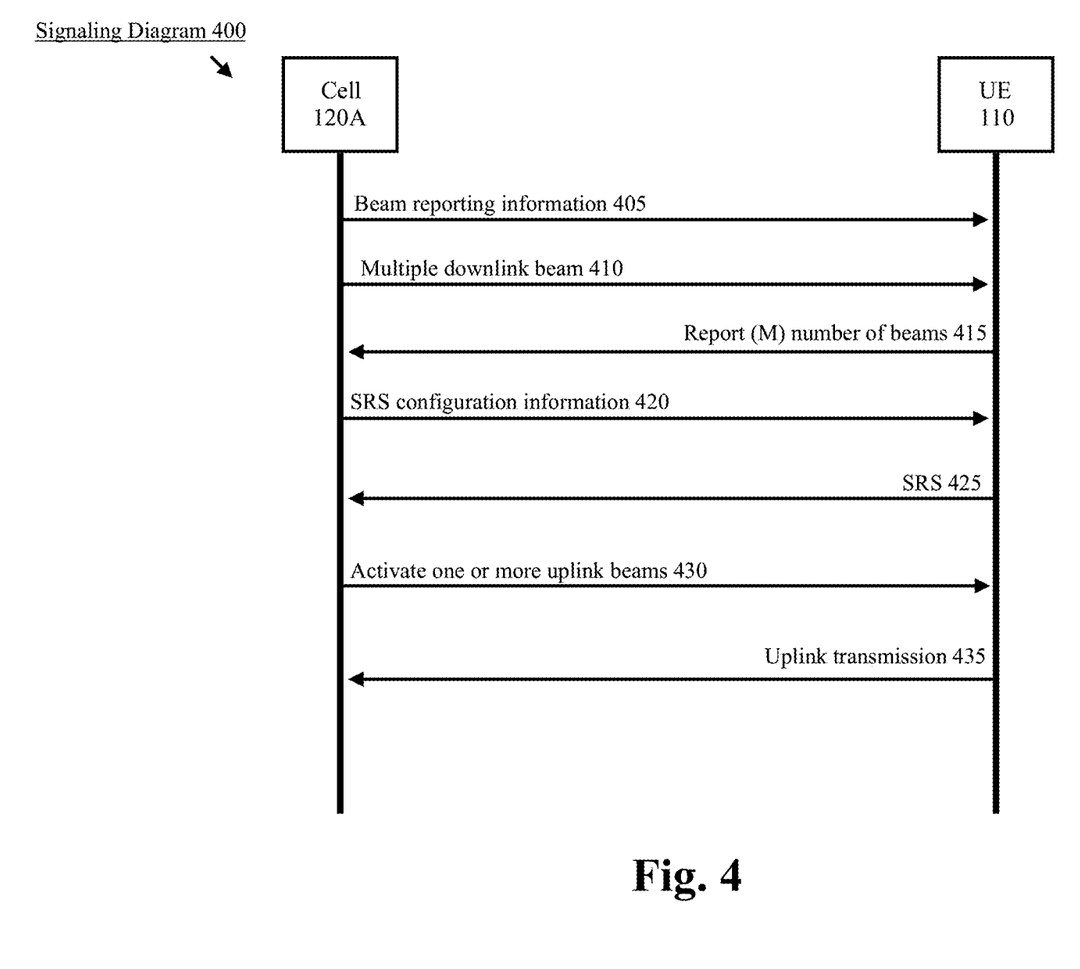
FIG. 4 shows a signaling diagram for enabling multi-TRP based uplink transmission according to various exemplary embodiments.

FIG. 4 shows a signaling diagram 400 for enabling multi-TRP based uplink transmission according to various exemplary embodiments. The signaling diagram 400 will be described with regard to the network arrangement of FIG. 1 and the UE 110 of FIG. 3.

In 405, the UE 110 receives configuration information for beam reporting from the currently camped cell 120A. For example, the higher layers may instruct the UE 110 to report (M) number of downlink beams that satisfy certain conditions. The information may also include, or the UE 110 may have been previously provided, one or more threshold values for selecting proper DL beams for reporting.

In 410, cell 120A transmits multiple downlink beams to the UE 110. For example, the cell 120A may perform a beam sweep using one or more TRPs.

In 415, the UE 110 transmits a report to the cell 120A that identifies up to (M) number of DL beams that fulfil the reporting metric. For example, the UE 110 may collect measurement results from the downlink beams. Each of the downlink beams may be associated with a different channel resource indication (CRI) and/or synchronization signal block (SSB) resource indication (RI). Thus, the report may identify downlink beams based on their respective CRI, SSB RI or any other appropriate type of identifier.

In this example, (M) is equal to two. Thus, a single report instance may identify/include multiple different DL beams by reporting the corresponding measurement result (e.g., CRI, SSB RI, etc.). In a multi-TRP deployment scenario, different beams may correspond to a single TRP or different beams may correspond to different TRPs. However, the exemplary embodiments are not limited to (M) being equal to two. Those skilled in the art will understand how the exemplary concepts described herein will be applied to scenarios in which (M) is equal to more than two.

In 420, the cell 120A transmits sounding resource signal (SRS) configuration information to the UE 110. The SRS configuration information may identify SRS resources for uplink beam tracking. For example, each SRS resource may be configured with a spatial relation information (spatialRelationInfo) parameter. Generally, spatial relation information for an SRS indicates a spatial relationship between the SRS and another downlink or uplink resource/signal. In other words, the UE 110 may know the beam direction in which to transmit uplink signals or channels to a TRP based on the spatial relation information provided by gNB. On the network side, the spatial relation information may be determined based on the measurement report transmitted in 415 by the UE or on any other appropriate basis, e.g., measurements on SRS resource conducted by the gNB.

As will be described below, in some embodiments, a medium access control (MAC) control element (CE) may be used for activation or deactivation of paired spatial relation information for multi-TRP uplink transmission. The UE 110 may receive this MAC CE prior to the transmission in 420. Thus, the UE 110 may be aware of the type of resources and configurations that may be triggered by the SRS configuration information in 420.

In 425, the UE 110 transmits multiple SRS in response to the SRS configuration information. For example, the UE 110 may perform a beam sweep and each SRS may be associated with a different beam. The direction of each beam may be based on its corresponding spatialRelationInfo or may be identified in any other appropriate manner.

In 430, the cell 120A may select one or more beam pairs that the UE 110 is to utilize for uplink transmission. For example, the cell 120A may collect measurement results corresponding to the SRS transmitted by the UE 110 in 425. The cell 120A may then select which beam the UE 110 is to utilize for subsequent uplink transmissions on the PUCCH and/or the PUSCH. This may include multiple spatialRelationInfo (e.g. beam) pairs for uplink transmissions.

In some embodiments, the cell 120A may transmit a signal to the UE 110 that explicitly identifies the selected one or more uplink beam pairs. For example, downlink control information (DCI) may be configured to include a spatialRelationInfo field configured to activate one or more uplink beams for uplink transmission. As will be described in more detail below, in other embodiments, an implicit rule based on the latest associated SRS resource may be implemented.

In 435, the UE 110 performs an uplink transmission (e.g., PUCCH transmission or PUSCH transmission) using the activated one or more uplink beam pairs. As will be described in detail below, the uplink transmission may include implementing sub-slot repetition. For example, a first beam of a beam pair may be configured to perform uplink transmissions (e.g. repetitions) to a first TRP and a second beam of the beam pair may be configured to provide uplink transmissions (e.g. repetitions) to a second TRP.

Figure 5A:
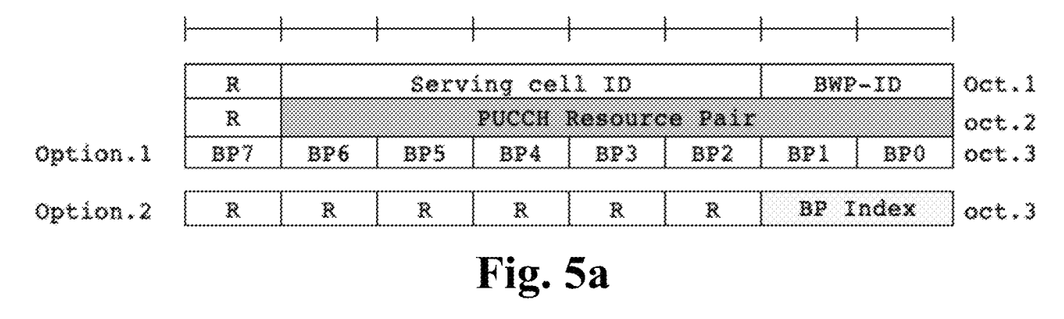
FIG. 5a illustrates an example of a medium access control (MAC) control element (CE) for activation or deactivation of paired spatial relation information for multi-TRP uplink transmission according to various exemplary embodiments.

In some embodiments, a new MAC CE may be implemented for activation or deactivation of paired spatial relation information for multi-TRP uplink transmission. The MAC CE may also include BWP-ID field to indicate the associated bandwidth part (BWP) of a serving cell (e.g., cell 120A). FIG. 5a illustrates an example of a MAC CE for activation or deactivation of paired spatial relation information for multi-TRP uplink transmission according to various exemplary embodiments.

The serving cell ID field of the MAC CE indicates the identity of the serving cell for which the MAC CE applies. In some embodiments, this field may be used to indicate a group or cells that share a spatial relation for uplink transmission in a carrier aggregation scenario (e.g., intra-band component carrier (CCs), etc.).

The BWP ID field of the MAC CE indicates the uplink BWP for which the MAC CE applies. In some embodiments, this field may be omitted for a CC with a single uplink BWP or shared uplink spatial relation across BWPs within a CC.

Figure 5B:
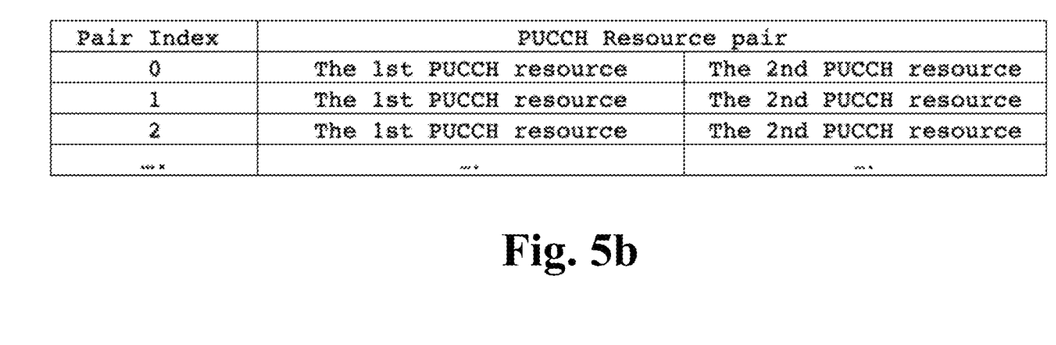
FIG. 5b shows an example of PRP configuration for different TRPs according to various exemplary embodiments.

The PUCCH resource pair field contains an identifier of a PUCCH resource pair (PRP). In this example, this identifier may be referred to as a "PUCCH-ResourceIDPair." The PUCCH-ResourceIDPair may correspond to spatialRelationinfo pairs such as, the spatialRelationinfo pair configured by the network in 430 of the signaling diagram 400. FIG. 5b shows an example of PRP configuration for different TRPs. In this example, each PRP index is associated with two TRP-specific PUCCH resources (with different activated spatial relation information) with or without repetition according to various exemplary embodiments.

In some embodiments, as shown by option 1 of FIG. 5a, the MAC CE may include BP(i) fields (e.g., BP1-BP0) which indicate the activation status of PUCCH spatialRelationInfo pairs (e.g., a beam pair (BP) equal to i+1. The BPs may be configured by the network in 430 of the signaling diagram 430. Then, for a given PRP one of these configured BPs may be activated or deactivated using a MAC CE by either setting a BP(i) to be deactivated (e.g., set field to 0 or any other appropriate indication) or activated (e.g., set field to 1 or any other appropriate indication).

In some embodiments, as shown by option 2 of FIG. 5a, the activated BP index may be provided by BP Index field in MAC CE. This option keeps signaling overhead to a minimum when only one BP is activated for a given PRP.

The PUCCH resources may be configured in a variety of different ways. In one approach, the paired PUCCH resources may be associated with a single PUCCH configuration (e.g., the same PUCCH-ResourceSetId). In addition, an offset value may be configured to determine the second PUCCH resource based on the starting symbolIndex configured for the first PUCCH resource in the pair. In some embodiments, the offset may be configured by a cell using RRC signaling in symbols, either in a same slot or different slot.

Figure 6:
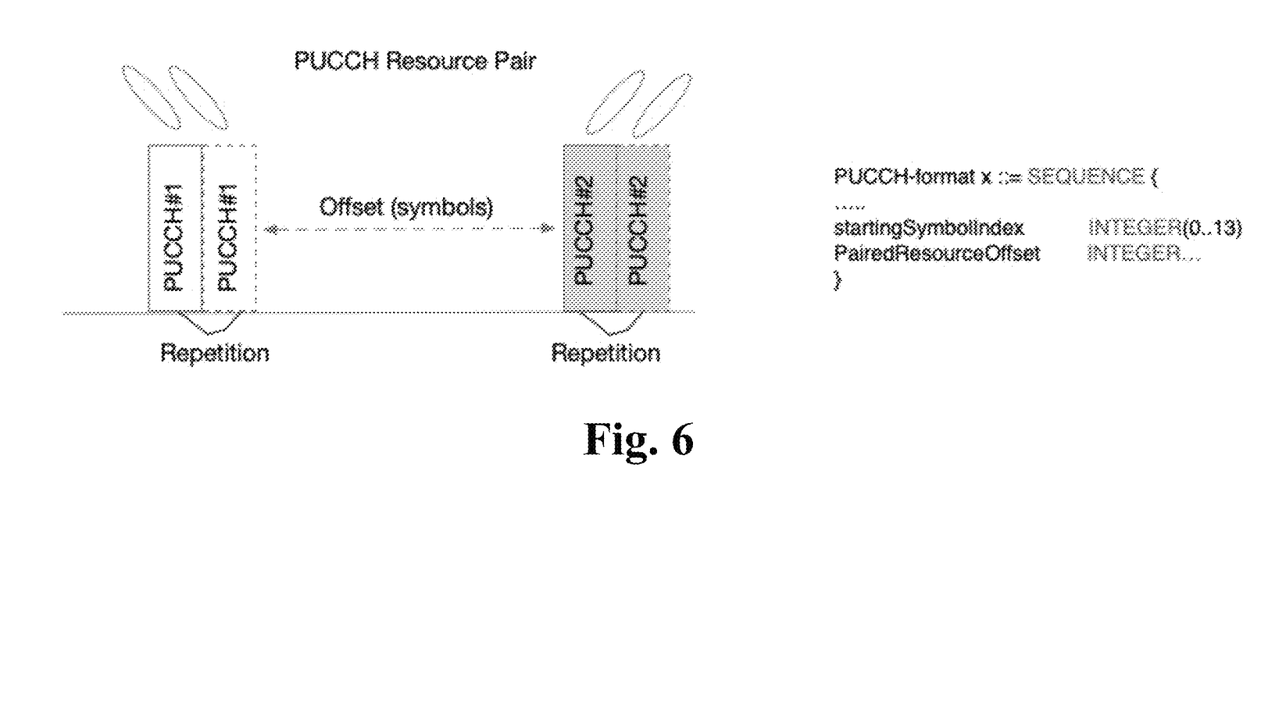
FIG. 6 illustrates an exemplary scenario in which PUCCH repetition is configured for each TRP according to various exemplary embodiments.

FIG. 6 illustrates an exemplary scenario in which PUCCH repetition is configured for each TRP according to various exemplary embodiments. In this example, the offset value to derive the PUCCH resource in the second TRP is defined after the ending symbol of the last repeated PUCCH resource.

In another approach, sub-slot based PUCCH repetition may be implemented. In one example, a slot may be divided into (N) sub-slots, where $N=N_{symbol}^{slot}/M$ and M may be configured by the higher layers. In this example, M is equal to two. However, the exemplary embodiments may apply to M being any appropriate number.

For PUCCH repetitions with a same spatial relation, the repeated transmission may be over consecutive sub-slots or slots which may be configured by radio resource control (RRC) signaling. For PUCCH repetitions with different spatial relations, the offset between the repeated transmissions with a first spatial relation and that of a second spatial relation may be defined in units of PUCCH sub-slots. This configuration may facilitate multiplexing between multi-TRP PUCCH repetition with legacy UEs into a single PUCCH resource set and thus, improves the uplink spectrum efficiency.

Figure 7:
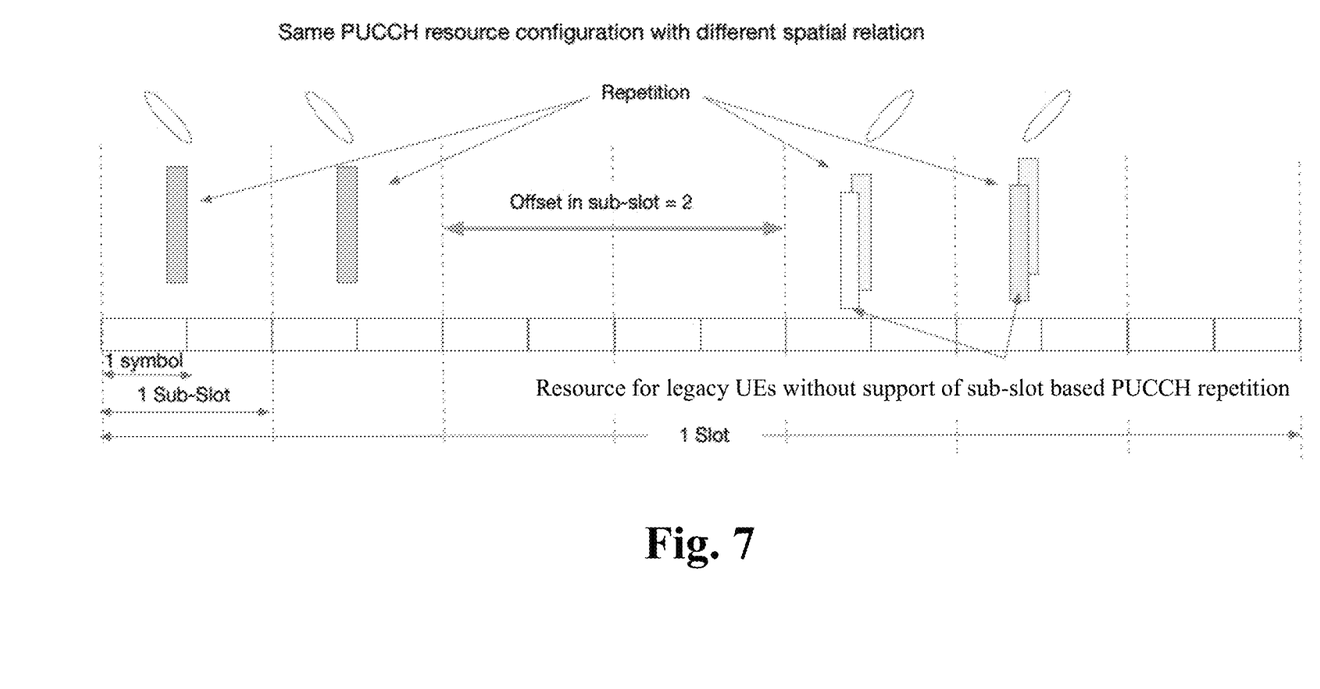
FIG. 7 illustrates an exemplary scenario for sub-slot based PUCCH repetition according to various exemplary embodiments.

FIG. 7 illustrates an exemplary scenario for sub-slot based PUCCH repetition according to various exemplary embodiments. In this example, (N) is equal to seven sub-slots and M is equal to two symbols for each sub-slot. In addition, this example assumes the repetition number configured by the cell for each PUCCH resource is two and the offset in units of sub-slots is also two.

In another approach, separate PUCCH resource configurations may be provided for different PUCCH resources associated with different spatial relations in PRP. To support this type of functionality, there may be separate PUCCH formats, additional demodulation reference signals (DMRS), a maximum code rate and simultaneous hybrid automatic repeat request (HARQ)-acknowledgement (ACK)-channel state information (CSI) procedures. In addition, PUCCH resource information such as a starting physical resource block (PRB), a number of PRBs, a starting symbol index, a number of symbols and/or a time domain orthogonal cover code (OCC) index. Further, power control related information such as a set of dedicated power control values for PUCCH (P0-set) and/or PUCCH power control adjustment states (two-PUCCH-PC-AdjustmentStates).

For all of the approaches mentioned above, in some embodiments, a new PUCCH frequency hopping may be introduced for constructive PUCCH transmission occasions with a same spatial relation. When frequency hopping is enabled, the frequency offset between hops across transmission occasions may be configured by higher layer parameters.

In some embodiments, the existing PUCCH resource indicator (PRI) may be reused. However, each code state of PRI may now indicate one of the PUCCH resource pairs. The mapping between PRI value and PRP resource may be configured by the higher layers.

Figure 8:
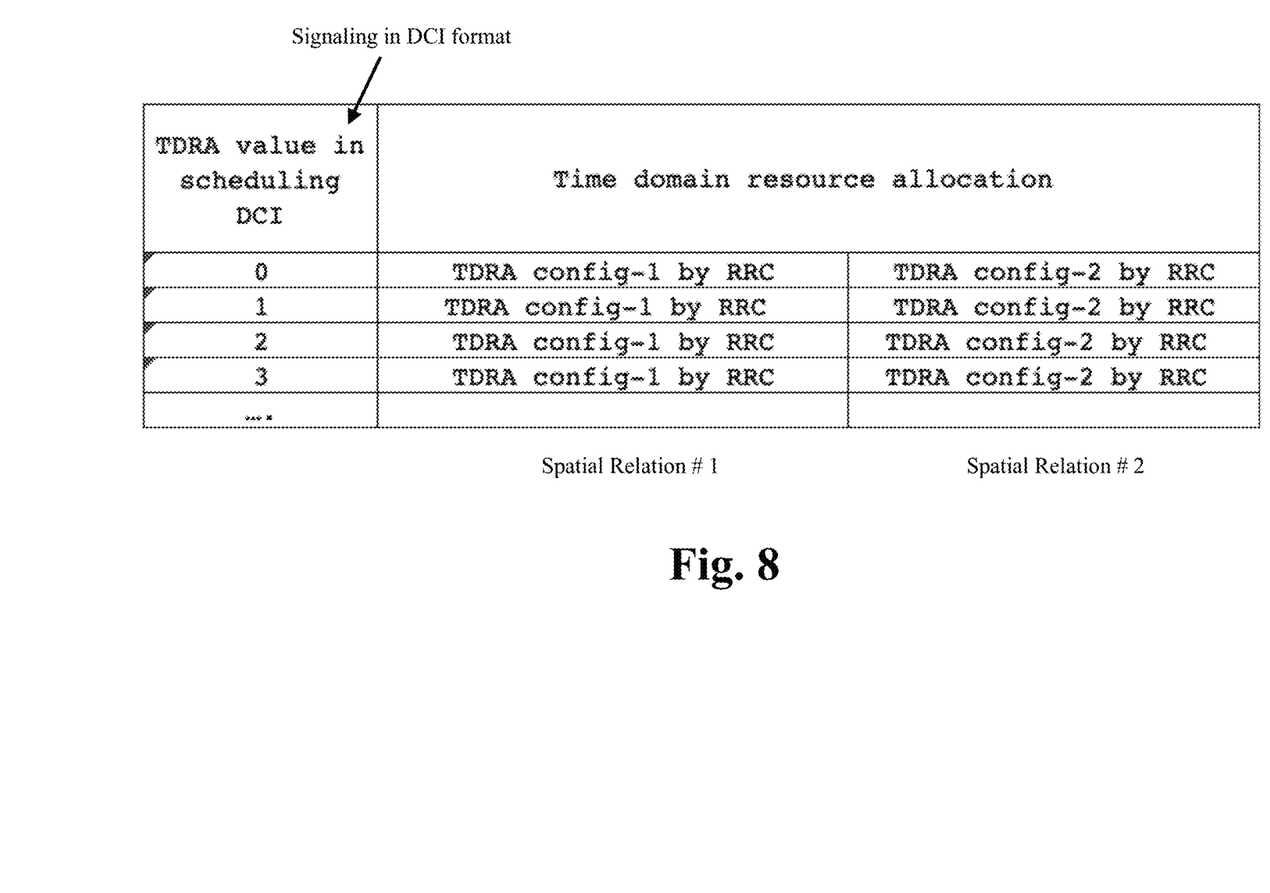
FIG. 8 shows an example of a time domain resource allocation (TDRA) table according to various exemplary embodiments.

For PUSCH transmissions in multi-TRP operation, more than one time domain resource allocation (TDRA) configuration may be provided by RRC signaling and associated with a single TDRA field in DCI format 1_1 for scheduling. In other words, each TDRA configuration may be associated with different spatial relation targeting to different TRPs. FIG. 8 shows an example of a TDRA table according to various exemplary embodiments.

In addition, for PUSCH repetition across TRPs, the UE 110 may dynamically indicate the TRP patterns by using one field or reusing the TDRA field. One example pattern may include cycling TRP transmissions, e.g., a first transmission to a first TRP, a second transmission to a second different TRP, a third transmission to the first TRP, a fourth transmission to the second TRP, etc. Another example pattern may include sequential transmission TRP by TRP, e.g., a first set of multiple transmissions to a first TRP and a second set of multiple transmissions to a second different TRP.

There are a variety of different approaches for PUCCH repetition configuration in a multi-TRP deployment scenario. In one approach, a single repetition number is configured by higher layers on a per PRP basis and may apply to PUCCH resources in a same PRP. For different PRPs, different repetition number may be configuration due to different PUCCH format configurations.

In another approach, different repetition numbers may be configuration for PUCCH resources in a same PRP. For example, a larger repetition number may be configured for a PUCCH resource targeting to a TRP with larger pathloss to meet a performance requirement for uplink control information (UCI). Thus, a first transmission repetition may be configured for a first PUCCH resource in the PRP and a second larger repetition may be configured for a second PUCCH resource in the PRP when the second PUCCH resource is associated with a TRP that has a larger pathloss.

Figure 9:
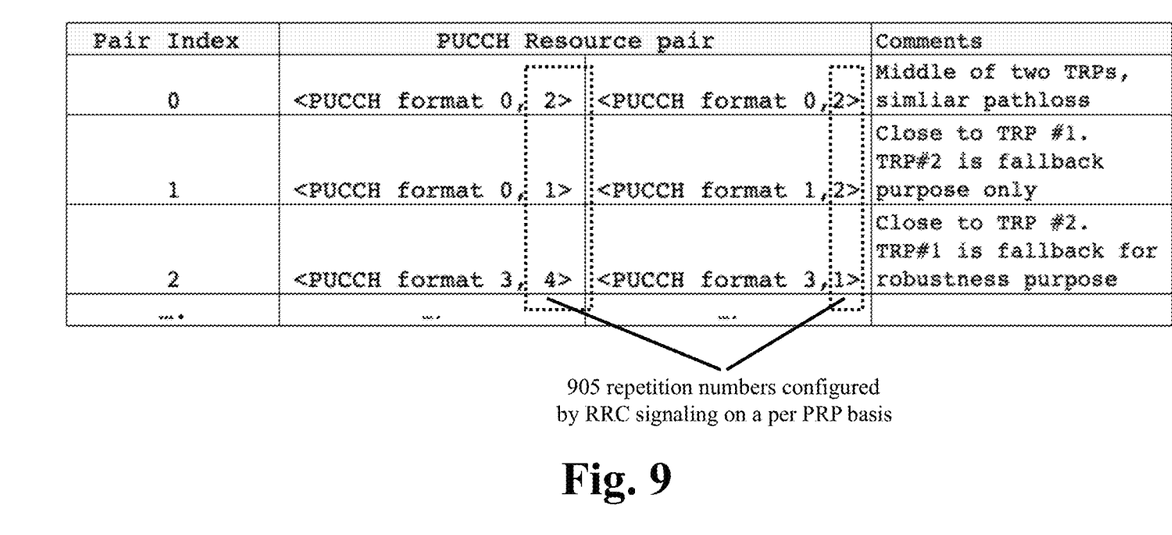
FIG. 9 illustrates an exemplary scenario in which an independent repetition number is configured for each physical uplink control channel (PUCCH) resource of each PUCCH resource pair (PRP) according to various exemplary embodiments.

FIG. 9 illustrates an exemplary scenario in which an independent repetition number is configured for each PUCCH resource of each PRP according to various exemplary embodiments. The table shown in FIG. 9 demonstrates an example of different repetition numbers configured for PUCCH resources in a same PRP. Here, PUCCH repetition may be performed dynamically depending on the coverage/reliability requirement by indexing different Pair index. The annotated portions of table identified by reference number 905 show repetition numbers configured by RRC signaling on a per PRP basis.

In another approach, a repetition number is configured on a per UCI type basis regardless of the PUCCH resource. This configuration may be beneficial for scenarios in which different performance requirements are defined for different UCI type (e.g., HARQ-ACK and CSI).

In some embodiments, a new spatial relation indication (SRI) may be added as a block in existing DCI format 2_2 if it is assigned to a UE configured with multi-TRP PUCCH and/or PUSCH transmission. For example, the SRI field set to a first value (e.g., 1) may indicate the transmit power command (TPC) is applied to the spatial relation configured for the first PUCCH or PUSCH resource. The SRI field may be set to a second value (e.g., 0) to indicate the TPC command is applied to the spatial relation configured for the second PUCCH or PUSCH resources.

Alternatively, the spatial relation of the detected DCI format 2_2 may be determined based on the TRP index that with which the detected PDCCH candidate is associated. For example, DCI format 2_2 in an even PDCCH candidate is associated with a first TRP and an odd PDCCH candidate is associated with a second TRP.

Figure 10:
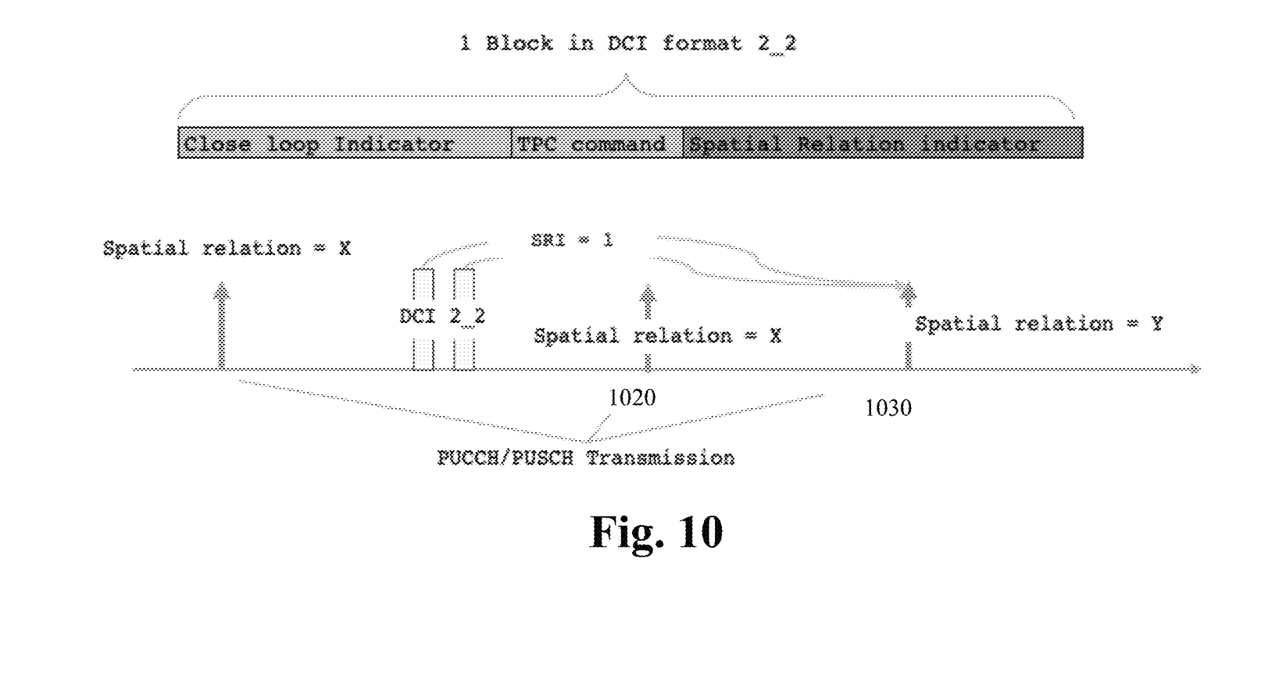
FIG. 10 illustrates an exemplary downlink control information (DCI) format 2_2 with spatial relation indicator (SRI) field and a scenario in which it may be used to control transmission power control (TPC) according to various exemplary embodiments.

FIG. 10 illustrates an exemplary DCI format 2_2 with SRI field and a scenario in which it may be used to control TPC according to various exemplary embodiments. In this example, it may be considered that spatial relation X is configured with a first PUCCH resource and spatial relation Y is configured with a second PUCCH resource. The TPC command in DCI format 2_2 may not be applied for PUCCH/PUSCH occasion 1020 as the SRI field is set to '1' and correspondingly, it applies for the spatial relation Y in transmission occasion 1030.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus comprising: memory coupled to processing circuitry, the processing circuitry configured to:

receiving an indication of multiple sounding reference signal (SRS) resources that are to be used for uplink beam tracking, wherein each SRS resource is associated with different spatial relation information;

generating, for transmission, at least one SRS using the associated spatial relation information;

receiving an indication that a user equipment (UE) is configured with one or more beam pairs, wherein the one or more beam pairs are uplink beam pairs and are configured by a network based on the at least one SRS;

receiving, prior to the indication that the UE is configured with one or more beam pairs, a medium access control (MAC) control element (CE), wherein the MAC CE is configured to activate the one or more beam pairs and includes a PUCCH resource pair field, wherein the PUCCH resource pair field contains a PUCCH resource pair; and generating, for transmission, at least one uplink channel based on the indicated one or more beam pairs, wherein a repetition of the at least one uplink channel is based on a spatial relationship of repeated transmissions, and wherein the spatial relationship of repeated transmissions includes an offset value that indicates a number of sub-slots.

2. The apparatus of claim 1, wherein a first beam of the one or more beam pairs is configured to transmit a first physical uplink control channel (PUCCH) resource to a first transmission and reception point (TRP) and a second beam of the one or more beam pairs is configured to transmit a second PUCCH resource to a second different TRP.

3. The apparatus of claim 2, wherein the operations further comprise:
receiving the offset value, wherein the offset value indicates a number of symbols between the first PUCCH resource and the second PUCCH resource.

4. The apparatus of claim 2, wherein the first PUCCH resource is transmitted in a first sub-slot and a second sub-slot consecutive to the first sub-slot.

5. The apparatus of claim 4, wherein the offset value indicates a number of sub-slots between the first PUCCH resource and the second PUCCH resource.

6. The apparatus of claim 2, wherein
the MAC CE is configured to activate the one or more beam pairs for multi-TRP PUCCH transmission.

7. The apparatus of claim 6, wherein the MAC CE includes an indication of an activation status of the one or more beam pairs.

8. The apparatus of claim 2, wherein the first PUCCH resource and the second PUCCH resource are associated with a single PUCCH configuration.

9. The apparatus of claim 2, wherein the first PUCCH resource and the second PUCCH resource are associated with different PUCCH configurations.

10. The apparatus of claim 9, wherein the operations further comprise:
receiving a PUCCH resource indicator (PRI), wherein each code state of the PRI indicates one of multiple PUCCH resource pairs.

11. The apparatus of claim 1, wherein the operations further comprise:
receiving a frequency offset parameter via higher layer signaling,
wherein transmitting the uplink channel includes PUCCH frequency hopping on consecutive physical uplink control channel (PUCCH) transmission occasions with a same spatial relation, and
wherein the frequency offset parameter includes a frequency offset for frequency hopping across the consecutive transmission occasions.

12. A user equipment (UE), comprising:
a transceiver configured to communicate with a network; and
a processor communicatively coupled to the transceiver and configured to perform operations comprising:
receiving an indication of multiple sounding reference signal (SRS) resources that are to be used for uplink beam tracking, wherein each SRS resource is associated with different spatial relation information;
generating, for transmission by the transceiver, at least one SRS using the associated spatial relation information;
receiving an indication that the UE is configured with one or more beam pairs, wherein the one or more beam pairs are uplink beam pairs and are configured by a network based on the at least one SRS
receiving, prior to the indication that the UE is configured with one or more beam pairs, a medium access control (MAC) control element (CE), wherein the MAC CE is configured to activate the one or more beam pairs and includes a PUCCH resource pair field, wherein the PUCCH resource pair field contains a PUCCH resource pair; and
generating, for transmission by the transceiver, at least one uplink channel based on the indicated one or more beam pairs, wherein a repetition of the at least one uplink channel is based on a spatial relationship of repeated transmissions, and wherein the spatial relationship of repeated transmissions includes an offset value that indicates a number of sub-slots.

13. The UE of claim 12, wherein a first beam of the one or more beam pairs is configured to transmit a first physical uplink shared channel (PUSCH) resource to a first transmission and reception point (TRP) and a second beam of the one or more beam pairs is configured to transmit a second PUSCH resource to a second different TRP.

14. The UE of claim 13, wherein the operations further comprise:
receiving a first-time domain resource allocation (TDRA) configuration associated with a first spatial relation and a second TDRA associated with a second spatial relation, the second spatial relation being different than the first spatial relation.

15. The UE of claim 13, wherein the UE indicates to the network a TRP pattern for the uplink transmission.

16. The UE of claim 13, wherein a first beam of the one or more beam pairs is configured to transmit a first physical uplink control channel (PUCCH) resource to a first TRP and a second beam of the one or more beam pairs is configured to transmit a second PUCCH resource to a second TRP, the second TRP being different than the first TRP.

17. The UE of claim 16, wherein a single repetition number is configured by higher layers on a per PUCCH resource pair (PRP) basis.

18. The UE of claim 16, wherein a different repetition number is configured by higher layers for PUCCH resources in a same PUCCH resource pair (PRP).

19. The UE of claim 16, wherein a repetition number is configured on an uplink control information (UCI) basis.

20. The UE of claim 12, wherein the operations further comprise:

receiving downlink control information (DCI) that includes a spatial relation indicator (SRI) assigned to the UE based on the UE being configured with multiple TRPs.

* * * * *